United States Patent [19]
Hantelmann et al.

[11] Patent Number: 5,188,497
[45] Date of Patent: Feb. 23, 1993

[54] GUIDE FOR STACK OF DISK-SHAPED ELEMENTS

[75] Inventors: Rolf Hantelmann, Cremlingen; Hartmut Schwark, Brunswick, both of Fed. Rep. of Germany

[73] Assignee: Schmalbach-Lubeca AG, Brunswick, Fed. Rep. of Germany

[21] Appl. No.: 634,147

[22] PCT Filed: Mar. 30, 1990

[86] PCT No.: PCT/EP90/00504
§ 371 Date: Dec. 7, 1990
§ 102(e) Date: Dec. 7, 1990

[30] Foreign Application Priority Data

Mar. 31, 1989 [DE] Fed. Rep. of Germany ....... 3910452

[51] Int. Cl.⁵ .............................................. B65G 19/18
[52] U.S. Cl. ................................. 413/45; 198/735.3
[58] Field of Search ...................... 413/45, 47, 48, 49, 413/50, 51; 198/735.3, 725, 717, 211, 735.1, 735.2; 271/149, 150

[56] References Cited

U.S. PATENT DOCUMENTS

| | | |
|---|---|---|
| 670,835 | 3/1901 | Bergland ............................. 413/51 |
| 3,350,842 | 11/1967 | Renish . |
| 4,000,709 | 1/1977 | Mojden ................................ 413/50 |
| 4,230,028 | 10/1980 | Knudsen ............................. 413/47 |
| 4,883,166 | 11/1989 | Whiteaker ........................ 198/688.1 |

FOREIGN PATENT DOCUMENTS

| | | |
|---|---|---|
| 150889 | 8/1985 | European Pat. Off. . |
| 2093970 | 2/1972 | France . |
| 2170874 | 9/1973 | France . |

Primary Examiner—Bruce M. Kisliuk
Assistant Examiner—Jack Lavinder
Attorney, Agent, or Firm—Herbert Dubno; Andrew Wilford; Yuri Kateshov

[57] ABSTRACT

A guide for a stack of disk-shaped elements, in particular for sheet-metal covers of cans, is provided which is formed of at least one longitudinally elongated profile element with a hollow cylindrical guide surface extending along the entire length of the profile element. Radially outside this guide surface is a guide passage for a flexible drive element which is seen in section cuts the section of the guide surface so as to form a gap such that the flexible drive element engages with the set-in sheet metal covers in frictional contact.

8 Claims, 1 Drawing Sheet

GUIDE FOR STACK OF DISK-SHAPED ELEMENTS

CROSS REFERENCE TO RELATED APPLICATIONS

This application is the national phase of PCT/EP/90/00504 filed Mar. 30, 1990 with a claim to the priority of German application 3,910,452 filed Mar. 31, 1989.

1. Field of the Invention

The invention relates to a guide for a stack of disk-shaped elements, such as covers for containers, in particular sheet-metal covers for cans.

2. Background of the Invention

Covers for cans are produced and used annually in the hundreds of millions. Although this is a mass-produced article, such covers are today highly developed and are subjected according to use to multiple production, treatment, transportation, and storage operations. This is true from the manufacture of the covers up to packing these covers in the form of stacks at the manufacturing location and also for filling plants where the covers, once again in stacks, must be transported from storage or supply regions at high speed and with great precision to other steps in the installation for fitting together with the respective containers or cans so that they can be closed up. The transport path in such a plant can be several hundred meters long. In addition the transport must take place frequently over several stories up or down and with movement through curves with direction change.

It is known to form the guides for this transport as troughs receiving the stack, which troughs are surrounded by a shell-like cage which is formed of longitudinal elements extending in the elongation direction of the guide and curved cross elements which hold together the longitudinal elements. Such guide systems are relatively expensive. The same is true for drive systems which are used with these guide systems in order to move the disk-shaped elements or covers along the guide for moving, accelerating, or stopping them.

OBJECT OF THE INVENTION

It is an object of the invention to provide a guide for the above-mentioned purpose which is extremely easy to manufacture and adapt to different applications and which ensures a simple and sure movement of the disk-shaped elements along the guide.

SUMMARY OF THE INVENTION

A transport system for a stack of like disks according to the invention has an elongated guide formed with a generally semicircular groove having a radius of curvature generally corresponding to that of the disks and a substantially circular-section passage having a predetermined passage diameter and extending parallel to and opening partially at a full-length slot into the groove. The slot has a predetermined transverse width substantially smaller than the passage diameter. A substantially circular-section and elongated guide strand in and generally filling the passage projects therefrom through the slot into the groove. The guide strand has a diameter greater than the transverse width of the slot and the strand is longitudinally displaceable in the passage and engages the rims of disks standing in the groove to displace the disks along the guide.

The longitudinally extending profiled element can have any length and can extend straight or can deviate from a straight line so as to be bent or wound downward, upward or to one side or another or can be steadily bent in any selected direction. The profile element can in a simple manner be made by any of the known methods, for instance by extrusion, extrusion molding, or simple molding. It can be made as a hollow tube out of light metal. Preferably it is however made of an antistatic synthetic resin or is coated with same. The disk-shaped elements can be set easily in the profile element in particular when the hollow cylindrical guide surface extends as seen in section over an angle of about 180° or slightly more. If necessary the open side of the profile element can be covered in any desired manner. It is also possible in regions of the conveyor where there is a danger that the profile elements come out of the guide to extend the hollow cylindrical guide surface over an angle greater than 180°. The guide passage for the flexible drive element lies preferably in the region of a bisector of the angle of the guide surface. The guide passage is thus preferably of circular section. The gap defined by the intersection of the extension of the guide surface and the guide passage preferably has a width which is substantially smaller than the diameter of the guide passage.

The drive element fitted in the guide passage is of limited stretchability but sufficient flexibility and is formed of a material that slides easily in the guide passage. The guide passage can in addition be clad with a layer of low-friction material. The drive element fills the cross section of the guide passage with only a small amount of play. In unloaded condition the cross section of the drive element projects slightly into the section which is defined by the guide surface. In the drive condition thus the disk-shaped elements engage with light pressure from their own weight on the flexible drive element and are thus surely accelerated, moved, and braked in the guide. This constitutes a particular advantage in that due to the shape of the guide passage it is possible to completely, that is right to the last disk-shaped element, empty it.

BRIEF DESCRIPTION OF THE DRAWING

The invention is described subsequently with reference to a schematic drawing in one embodiment.

There is shown in.

SPECIFIC DESCRIPTION

Figures 2, 3:
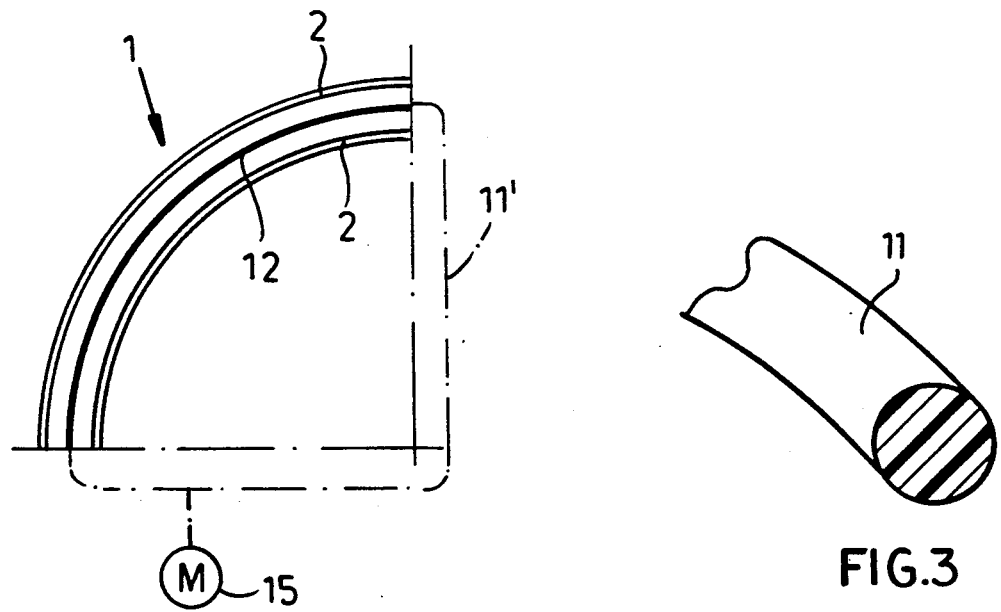
FIG. 2 in top view a profile element which is bent longitudinally along a quarter circle.
FIG. 3 in section and perspective view and in large scale a flexible drive element that is used in the guide according to the invention.

The guide according to the invention comprises a plurality of longitudinally extending profile elements such as the profile element 14 of FIG. 2 which are connected endwise to each other. The lengths of the individual profile elements can be different. Each profile element can be straight or curved to one of the other sides or upward or downward uniformly or can be bent. It is also possible to form the profile elements so that they follow with their longitudinal direction a predetermined line of steadily changing direction.

The profile elements can be made by casting, injection casting, or injection molding or according to another known production process of sufficient precision.

Figure 1:
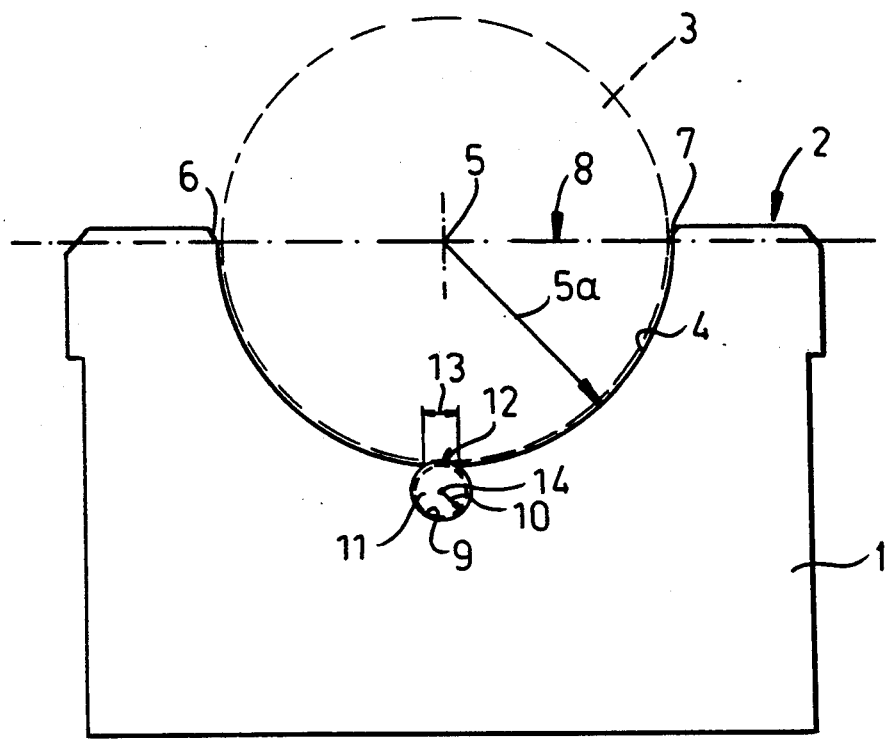
FIG. 1 in end view a profile element of a guide according to the invention.

As shown in end view according to FIG. 1, each profile element has a hollow cylindrical guide surface 4 complementary to the diameter of the disk-shaped elements 3 to be transported. In the illustrated embodiment this extends in section over an angle of about 180° or as shown slightly more. The stack of disk-shaped elements thus can be set easily into the guide surface of the profile element from above. For particular purposes, in particular for regions where there is a danger that the disk-shaped elements can pop out of the guide, the guide surface can extend circumferentially over more than 180°.

The longitudinal edges 6 and 7 of the guide surface 4 are chamfered. The flanking small upper surface strips 2 lie in the illustrated form slightly over the 180° plane 8.

The partly cylindrical guide surface 4 has a circular-section and a radius of curvature 5a drawn from its center 5 which is only slightly larger than the radius of the outer periphery of the disk-shaped elements so that they can easily but with slight play move along the guide surface while perpendicular thereto.

The guide 1 is formed of a low-friction material for the disk-shaped elements. It can also be coated at the surface 4 with such a material.

In the body 1 of the guide there is in each profile element a guide passage 9. In the illustrated embodiment it has a circular section and is arranged in the region of the bisector of the angle of the guide surface 4. The point on which the radius of curvature 10 of the guide passage 9 is centered lies radially outside the guide surface 4 so that the distance between the middle point and the guide surface 4 is smaller than the radius of curvature 10 so that the guide passage 9 intersects the guide surface 4 while forming a longitudinal gap 12. The width 13 of this gap is substantially smaller than the diameter of the guide passage 9. A longitudinally extending flexible drive element 11 is laid in the guide passage 9 and its diameter is only slightly less than the diameter of the guide 9. The material of the drive element and the material of the inner surface of the guide passage are set relative to each other such that the flexible guide element in spite of the slight play slides with only slight friction in the guide passage 9. The diameter of the flexible drive element 10 is selected in any case such that the drive element in the guide passage when unstressed extends slightly past the passage 9 and into the guide surface 4. In this manner when the disk-shaped elements are set into the guide surface 4 they will be sure under their own weight to engage the flexible drive element 11 and will be accelerated, transported, and braked thereby in the guide surface 4.

The flexible drive element follows the longitudinal direction of the profile element 14 in every direction and thus constitutes in every section of the entire transport path a sure driving and guiding element. It also facilitates a complete emptying of the guide right down to the last disk-shaped element.

The flexible drive element can be a cord spring. It can also be a wire, a cord, or a cable or a metal or synthetic-resin spring. Particularly usable as shown in FIG. 3 is a monofilament of an appropriate resin of a diameter fitted to the guide passage 9.

When guiding covers of sheet metal, for instance for drink cans, the guide surface can have a radius of about 33 mm. In this case the guide passage has a diameter of about 9 mm. The center of curvature of the guide passage thus lies about 2.5 mm outside the guide surface and on a bisector of the angle of the guide surface.

Using a profile element with the above-given dimensions curvatures for deviations or bends with a radius of at least 600 mm are possible. For the body 1 of the profile element or for the flexible drive element the following materials have been shown to be advantageous.

The body 1 is preferably made of a cast polyamide that advantageously is made antistatic. The flexible drive element on the other hand is made of a polyester which has a sufficient elasticity for this use.

We claim:

1. A transport system for a stack of like disks, the system comprising:
    an elongated guide formed with
        a generally semicircular groove having a radius of curvature generally corresponding to that of the disks, and
        a substantially circular-section passage having a predetermined passage diameter and extending parallel to and opening partially at a fulllength slot into the groove, the slot having a predetermined transverse width substantially smaller than the passage diameter; and
    a substantially circular-section elongated guide strand in and generally filling the passage and projecting therefrom through the slot into the groove, the guide strand having a diameter greater than the transverse width of the slot, the strand being longitudinally displaceable in the passage and engaging the stack of disks standing in the groove to displace the disks along the guide.

2. The transport system defined in claim 1 wherein the passage and groove have respective parallel centerlines spaced apart by a distance greater than a radius of curvature of the groove and less than the sum of the radii of curvature of the groove and of the passage.

3. The transport system defined in claim 1 wherein the guide is formed of an antistatic material.

4. The transport system defined in claim 1 wherein the groove is generally bisected by the slot.

5. The transport system defined in claim 1 wherein the strand is of substantially circular section and fits in the passage with slight play.

6. The transport system defined in claim 1 wherein the elongated guide has a face into which the groove is formed, the groove meeting the face at chamfered edges.

7. The transport system defined in claim 1 wherein the passage has a diameter between one-tenth and one-fifth the diameter of the groove.

8. The transport system defined in claim 1 wherein the centerlines of the groove and passage are parallel and curvilinear.

* * * * *